No. 751,501. PATENTED FEB. 9, 1904.
E. GUNDLACH.
ELECTRIC TELEPHONE.
APPLICATION FILED NOV. 10, 1902.
NO MODEL.
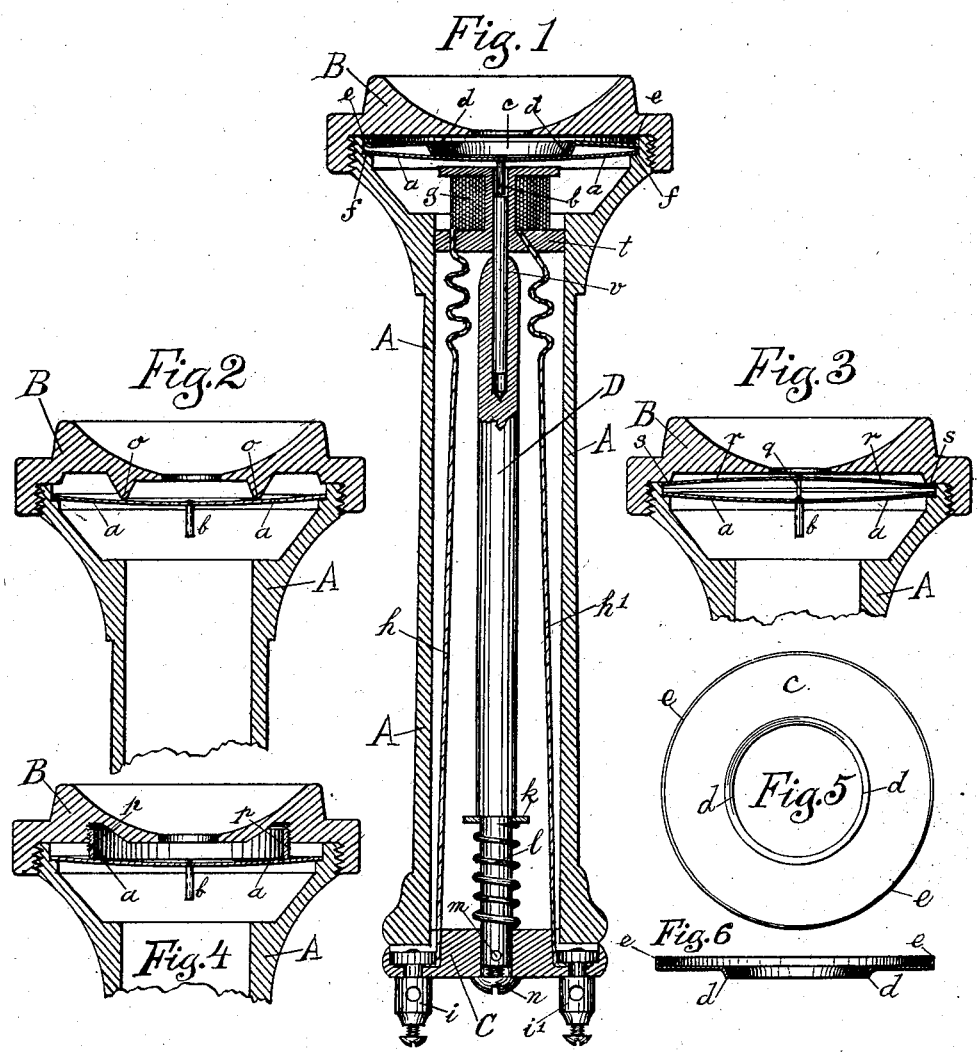
Witnesses.
James S. Knowlton Jr.
Karl Gundlach
Inventor.
Ernst Gundlach No. 751,501.                                                           Patented February 9, 1904.

UNITED STATES PATENT OFFICE.

ERNST GUNDLACH, OF WESTERN SPRINGS, ILLINOIS.

ELECTRIC TELEPHONE.

SPECIFICATION forming part of Letters Patent No. 751,501, dated February 9, 1904.

Application filed November 10, 1902. Serial No. 130,747. (No model.)

*To all whom it may concern:*

Be it known that I, ERNST GUNDLACH, a subject of the Emperor of Germany, residing at Western Springs, in the county of Cook and State of Illinois, have invented a new and useful Electric Telephone, of which the following is a specification.

My invention relates to improvements of the original Bell telephone, now generally employed as the receiving instrument; and the object of my improvements is to increase the sensitiveness of the combination of the pole-piece of the magnet and diaphragm, or, more correctly speaking, to increase the differences of the force of magnetic attraction of the magnet and diaphragm caused by the undulatory changes of the strength of the telephone-current. I attain this object by the devices illustrated in the accompanying drawings, in which—

Figure 1 is a longitudinal section of the entire instrument. Figs. 2, 3, and 4 represent modified forms of my diaphragm-tensioning device; and Figs. 5 and 6 are plan and sectional views, respectively, of the tensioning device shown in Fig. 1.

In my extensive experiments, carried out with the purpose of determining the true conditions of maximum efficiency of the electric telephone, I came to the conclusion that the permanent magnet performs two distinct functions equally important to the proper action of the instrument. These two functions may be described as follows: First, since the electric current now generally employed to actuate the receiving instrument is the induced current of an induction-coil, and is therefore alternate, the current is of equal strength at its positive and negative extremes of undulation. Now in order to obtain the required maximum and minimum force of magnetic attraction of the diaphragm by the stationary pole instead of equal attractions of opposite magnetic polarity the pole-piece must be permanently magnetized to a degree not less than the magnetic force would otherwise be which either of the undulatory extremes of the current would exert in the pole-piece. The amount of permanent magnetism required for this purpose alone is therefore very small, because the current producing such attraction is very small. Second, in order that the diaphragm may retract from the magnet-pole with sufficient energy and speed when the magnetic force of attraction diminishes it must be in a state of tension, which tension is produced in the ordinary telephone by magnetic attraction, and the magnetic force required for this purpose must be very great in order to give a favorable result. Thus while the maximum difference of magnetic force the telephone-current can produce requires but a very low degree of permanent magnetism a very high degree of magnetic force is required to give the diaphragm the necessary degree of tension. It is therefore important to take proper regard to the recognized fact that a steel bar or an iron piece is the less sensitive to the influence of a moderate magnetizing force the higher it is previously (permanently) magnetized, and therefore the pole-piece of the permanent magnet of the ordinary telephone would be much more sensitive to the magnetizing influence of the telephone-current if its permanent magnetism were not greater than required to produce the maximum difference of attraction, as pointed out above. On the basis of this principle I conceived the idea that by far the greater part of the permanent magnetism in the ordinary telephone could be dispensed with and thereby the sensitiveness of the pole-piece to the magnetizing influence of the current greatly increased if the necessary tension of the diaphragm be produced by mechanical means. The magnetic attraction, however, as a means of producing the said tension has the advantage over any mechanical means that it increases with the approach of the diaphragm to the magnet-pole, which increase partly counteracts the increase of the backward pull of the diaphragm, thereby increasing accordingly the amplitude of vibration of the latter. For this reason the most favorable result is obtained if a certain moderate amount of magnetic force is employed to take part in the function of setting the diaphragm in tension and the rest of the required total of force be produced mechanically. Furthermore, I have found that the size of the soft-iron pole-piece of the magnet is an important factor in the construction of the telephone. The mass of iron, if magnetized, restrains or tends to retard the undulatory changes of the magnetic force, thereby diminishing their amplitude. In the ordinary telephone this impairing influence is considerable, owing to the comparatively large diameter the pole-piece must have to carry the large amount of permanent magnetism required, and my improvement of the diaphragm will be of little avail to the efficiency of the instrument unless the pole-piece is at the same time considerably reduced in diameter. Since, however, such a pole-piece presents a correspondingly smaller surface to the diaphragm, the magnetic force upon the diaphragm is accordingly diminished, and little would therefore be gained by the mere reduction of the diameter of the pole-piece. I overcome this difficulty by providing the diaphragm with a small soft-iron pole-piece projecting from the center toward the magnet-pole, and I so place the wire coil carrying the telephone-current that the pole-piece of the diaphragm extends into the same and meets the pole of the permanent magnet just at or near the center of the coil. By this arrangement the current passing through the coil acts more directly and effectively upon the poles, since, as a matter of fact, the point of highest magnetizing power of a coil is at its center, and the force of mutual magnetic attraction of the poles, as well as the amplitude of its undulatory changes, is considerably increased, more than compensating the loss which otherwise would result from the reduced size of the pole-piece of the magnet.

Fig. 1 of the accompanying drawings is a complete representation of my new telephone, showing the improvements in accordance to the principles laid down in the foregoing. A is a hard-rubber casing, in which the instrument is inclosed in the usual manner. D is the permanent magnet, being a tempered and magnetized round steel bar of about five-sixteenths of an inch diameter. At its back end it is provided with an adjustment effected by the screw $n$. The bar is pressed toward the front or diaphragm by the coiled spring $l$, which presses against the washer $k$, secured to the bar, and backward against the hard-rubber piece C. M is a cross-pin secured to the magnet-bar and sliding in a groove cut longitudinally in the central hole of C and serving to prevent the turning of the bar when the screw $n$ is turned. At its front end the bar is bored or hollowed out to receive the soft-iron pole-piece $v$, which is only about one-eighth of an inch in diameter and is tightly secured to the bar. Upon the front end of the pole-piece the spool $t$ is tightly secured, on which the usual wire coil $g$ is wound, the terminals of which are connected with the binding-posts $i$ and $i'$ by the connection-wires $h$ and $h'$, respectively, in the usual manner. The pole-piece $v$ reaches into the spool $t$ to a point only about one-sixteenth of an inch beyond the center of the coil $g$. $a$ is the diaphragm, which is made of spring hard hammered or rolled iron. It is about two inches in diameter and measures about 0.010 inches thickness. In its center the soft-iron pole-piece $b$ is rigidly secured to it, which is about one-twelfth of an inch in diameter and one-fourth of an inch long and reaches into the spool $t$ to the pole-piece $v$, nearly touching the same. The diaphragm is set in tension by the annular "tension-spring" $c$. (Separately shown in Figs. 5 and 6.) This spring is made of hard rolled aluminium of about 0.010 of an inch thickness. The inner circular edge $d$ is bent over, so as to project from the flat surface toward the diaphragm, while the outer edge $e$ is bent over in the opposite direction toward the hard-rubber cover B. The spring is of the same outside diameter as the diaphragm $a$, and both fit into a recess of the casing A. The diaphragm rests with its edge on the bottom or shoulder $f$ of this recess, while the spring rests with its inner edge $d$ against the diaphragm. When the cover B is removed, both the diaphragm and the spring are flat, the latter as shown in Fig. 6, and the outer edge $e$ of the latter projects from its recess about one twenty-fifth of an inch above the edge of the casing. When the cover is screwed on the casing, the inner flat surface of the same presses the edge $e$ of the spring down to the level of the edge of the casing and compels the inner part of the spring to bend outward toward the cover and the inner part of the diaphragm to bend inward, both as shown in Fig. 1, and thus the latter assumes a state of tension. The degree of the tension depends on the height of the edge $e$ above the edge of the casing when the cover is removed. I have also tried a number of other devices, of which I describe and show a few in this specification; but I found it difficult to determine which of them gives the best results. In the two devices shown in Figs. 2 and 4 I employ no tension-spring at all, but provide the cover B with a solid rigid rim $o$, Fig. 2, which projects from the inner surface toward the diaphragm far enough to press the latter a little downward. In Fig. 4 this rim is made adjustable. It consists of a brass ring $p$, which screws adjustably into the hard-rubber cover B. In Fig. 3 the tension-spring has the form of a diaphragm and is provided with a thin light central pin, which presses against the diaphragm and is of just such a length as to give the diaphragm the desired degree of tension when the cover B is screwed on and presses the edge $s$ of the spring down to the level of the edge of the casing.

It clearly appears from the description of my new instrument that my invention consists, chiefly, of the combination of a device for tensioning the diaphragm by mechanical force and a low-power permanent magnet, the magnetic power of which would be by itself alone wholly insufficient to give the diaphragm the required degree of tension. I have in my description given the approximate dimensions of the magnet and its unusually small pole-piece and have clearly pointed out the reasons why a magnet with a pole-piece of such small size or diameter and of such reduced force is much more sensitive to the influence of the telephone-current and how it will result in a corresponding increase of the efficiency of the instrument if otherwise the diaphragm be given a sufficient degree of tension by special mechanical means. I have also provided the diaphragm of my instrument with a soft-iron pole-piece extending into the wire coil, same as described in United States Patent No. 297,470, Strangways, April 22, 1884, in order to compensate for the diminished vibratory influence of the permanent magnet upon the diaphragm resulting from the small or reduced area of the surface which the pole-piece of the magnet would otherwise present to the diaphragm. I have obtained a new and improved result by these new combinations.

I claim—

1. In an electric telephone, the combination with the vibratory diaphragm, of a device for tensioning said diaphragm by mechanical force, and a low-power permanent magnet having a pole-piece of small diameter or cross-section, substantially as described and shown.

2. In an electric telephone, the combination with the vibratory diaphragm of a device for tensioning said diaphragm by mechanical force, and a permanent magnet having a pole-piece of small diameter or cross-section, and being of smaller power than required for tensioning said diaphragm without the aid of said mechanical force substantially as specified and shown.

3. In an electric telephone, the combination, with the vibratory diaphragm, of a device for tensioning said diaphragm by mechanical force, and a permanent magnet having a smaller power than that required for tensioning said diaphragm without the aid of said mechanical force, substantially as specified.

4. In an electric telephone, the combination, with the vibratory diaphragm, of a soft-iron pole-piece centrally secured to said diaphragm and extending into the wire coil of the instrument; a device for tensioning said diaphragm by mechanical force, and a permanent magnet having a pole-piece of small diameter or cross-section and being of smaller power than required for tensioning said diaphragm without the aid of said mechanical force, substantially as specified and shown.

5. In an electric telephone, the combination with the diaphragm, of an annular tension-spring having oppositely-directed side projections at its outer and inner edges respectively, the inner projection being directed toward the diaphragm substantially as described.

6. In an electric telephone, the combination of the vibratory diaphragm, the permanent magnet deflecting and tensioning said diaphragm inwardly, and a circular or annular spring acting upon the outer side of said diaphragm and increasing said inward deflection and tension of the same, substantially as, and for the purpose specified.

7. In an electric telephone, the combination, with the vibratory diaphragm, of a circular or annular tension-spring mounted on one side of said diaphragm and pressed against or toward the same at its edge, and having a projection extending toward said diaphragm and being adapted to set the said diaphragm in a state of tension substantially as, and for the purpose specified.

8. In an electric telephone, the combination, with the vibratory diaphragm, of a circular or annular tension-spring mounted on one side of said diaphragm so as to be pressed against or toward the same, thereby setting the diaphragm in a state of tension, substantially as specified and shown.

ERNST GUNDLACH.

Witnesses:
 JAMES S. KNOWLSON, Jr.,
 KARL GUNDLACH.